US 6,714,432 B2

(12) United States Patent
Tomioka et al.

(10) Patent No.: US 6,714,432 B2
(45) Date of Patent: Mar. 30, 2004

(54) MEMORY CONTROL DEVICE

(75) Inventors: Masaya Tomioka, Kanagawa (JP); Toshiyuki Ujisawa, Kanagawa (JP)

(73) Assignee: Sony Corporation (JP)

( * ) Notice: Subject to any disclaimer, the term of this patent is extended or adjusted under 35 U.S.C. 154(b) by 354 days.

(21) Appl. No.: 09/873,426

(22) Filed: Jun. 5, 2001

(65) Prior Publication Data
US 2001/0049777 A1 Dec. 6, 2001

(30) Foreign Application Priority Data
Jun. 6, 2000 (JP) .................................. P2000-174212

(51) Int. Cl.[7] .............................................. G06F 13/00
(52) U.S. Cl. ............................... 365/53.32; 365/44.32; 365/47.32; 365/47.44; 365/53.12; 365/53.34; 365/53.36; 713/400; 711/167
(58) Field of Search ................................. 711/167, 112; 713/400, 500, 600; 369/47.28, 47.32, 47.33, 47.44, 53.34, 53.35, 53.36, 124.08, 124.14, 53.12, 53.32, 54.42

(56) References Cited

U.S. PATENT DOCUMENTS

| 5,453,964 | A | * | 9/1995 | Shimizume | 369/47.32 |
|---|---|---|---|---|---|
| 5,485,447 | A | * | 1/1996 | Minoda | 369/47.12 |
| 5,831,955 | A | * | 11/1998 | Arataki et al. | 369/47.32 |
| 5,856,962 | A | * | 1/1999 | Inagawa et al. | 369/47.19 |
| 5,910,935 | A | * | 6/1999 | Takagi et al. | 369/47.34 |
| 6,150,888 | A | * | 11/2000 | Nakazawa | 331/11 |
| 6,185,172 | B1 | * | 2/2001 | Nakazawa | 369/47.46 |
| 6,269,061 | B1 | * | 7/2001 | Shimizume et al. | 369/47.3 |
| 6,404,713 | B1 | * | 6/2002 | Ueki | 369/47.53 |
| 6,587,422 | B1 | * | 7/2003 | Tsukihashi | 369/124.03 |

* cited by examiner

Primary Examiner—Hong Kim
(74) Attorney, Agent, or Firm—Rader, Fishman & Grauer PLLC; Ronald P. Kananen

(57) ABSTRACT

A memory control device capable of controlling data writing into a buffer memory where the data reproduced from a disk recording medium are stored temporarily is disclosed. The control device comprises a signal generation circuit for generating a stable sync detection signal which is obtained at a normal detection timing of a synchronizing signal in response to a sync detection signal generated by detection of the synchronizing signal inserted in the reproduced data per predetermined data unit. The control device further comprises a data writing controller capable of reading out time base information inserted per predetermined data unit in synchronism with the timing of generation of the stable sync detection signal, and also capable of controlling the data writing into the buffer memory on the basis of the time base information thus read. In this structure even when the reproduction state is rendered unsteady to some degree, the data read out from the recording medium can still be written properly into the buffer memory to thereby ensure high fidelity of the reproduced data.

6 Claims, 14 Drawing Sheets

FIG.10A

| FRAME | SUBCODING FRAME |
|---|---|
| $98n+1$ | SYNC PATTERN (S0) |
| $98n+2$ | SYNC PATTERN (S1) |
| $98n+3$ | $P_1$ $Q_1$ $R_1$ $S_1$ $T_1$ $U_1$ $V_1$ $W_1$ |
| $98n+4$ | $P_2$ $Q_2$ $R_2$ $S_2$ $T_2$ $U_2$ $V_2$ $W_2$ |
| ⋮ | ⋮ |
| $98n+97$ | $P_{95}$ $Q_{95}$ $R_{95}$ $S_{95}$ $T_{95}$ $U_{95}$ $V_{95}$ $W_{95}$ |
| $98n+98$ | $P_{96}$ $Q_{96}$ $R_{96}$ $S_{96}$ $T_{96}$ $U_{96}$ $V_{96}$ $W_{96}$ |
| $98(n+1)+1$ | |

FIG.10B

| $Q_1 - Q_4$ | $Q_5 - Q_8$ | $Q_9$ — $Q_{80}$ | $Q_{81} - Q_{96}$ |
|---|---|---|---|
| CONTROL | ADDRESS | SUBQ DATA | CRC |

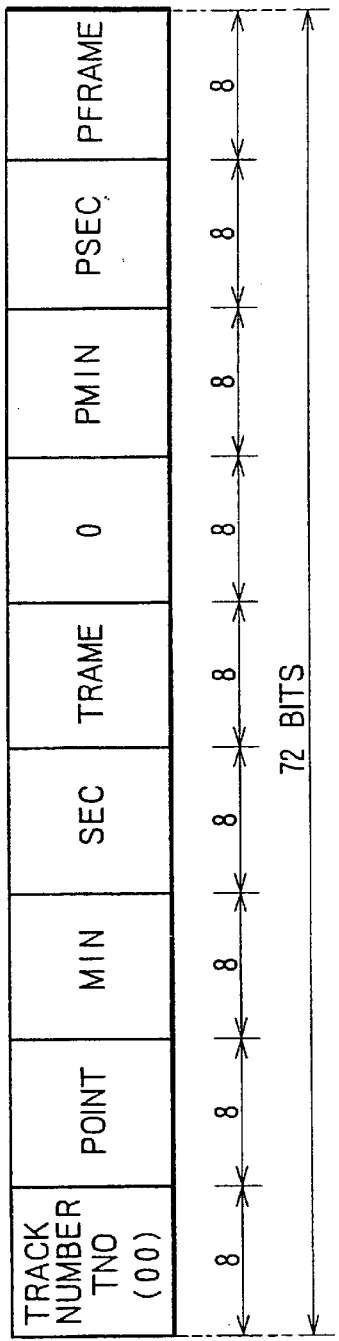
FIG.11A SUB Q DATA IN LEAD-IN AREA (TOC)
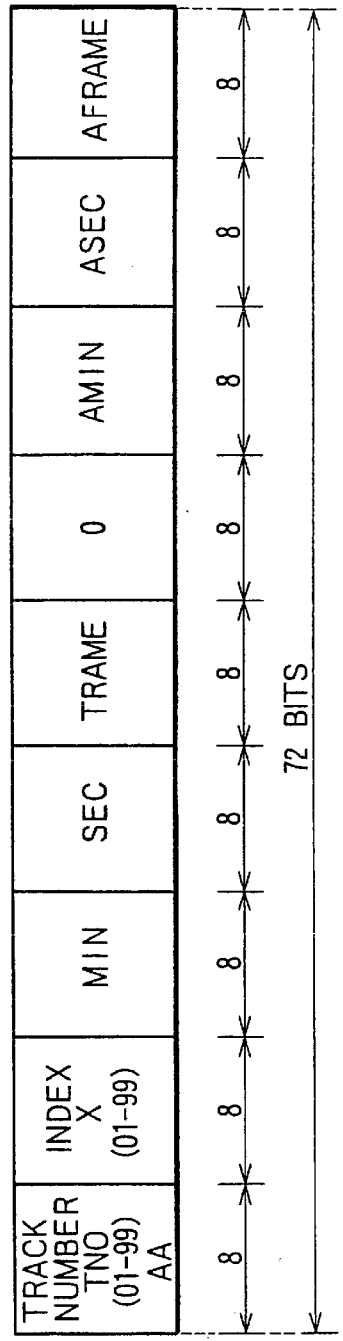
FIG.11A SUB Q DATA IN TRACKS #1~#n AND LEAD-OUT AREA

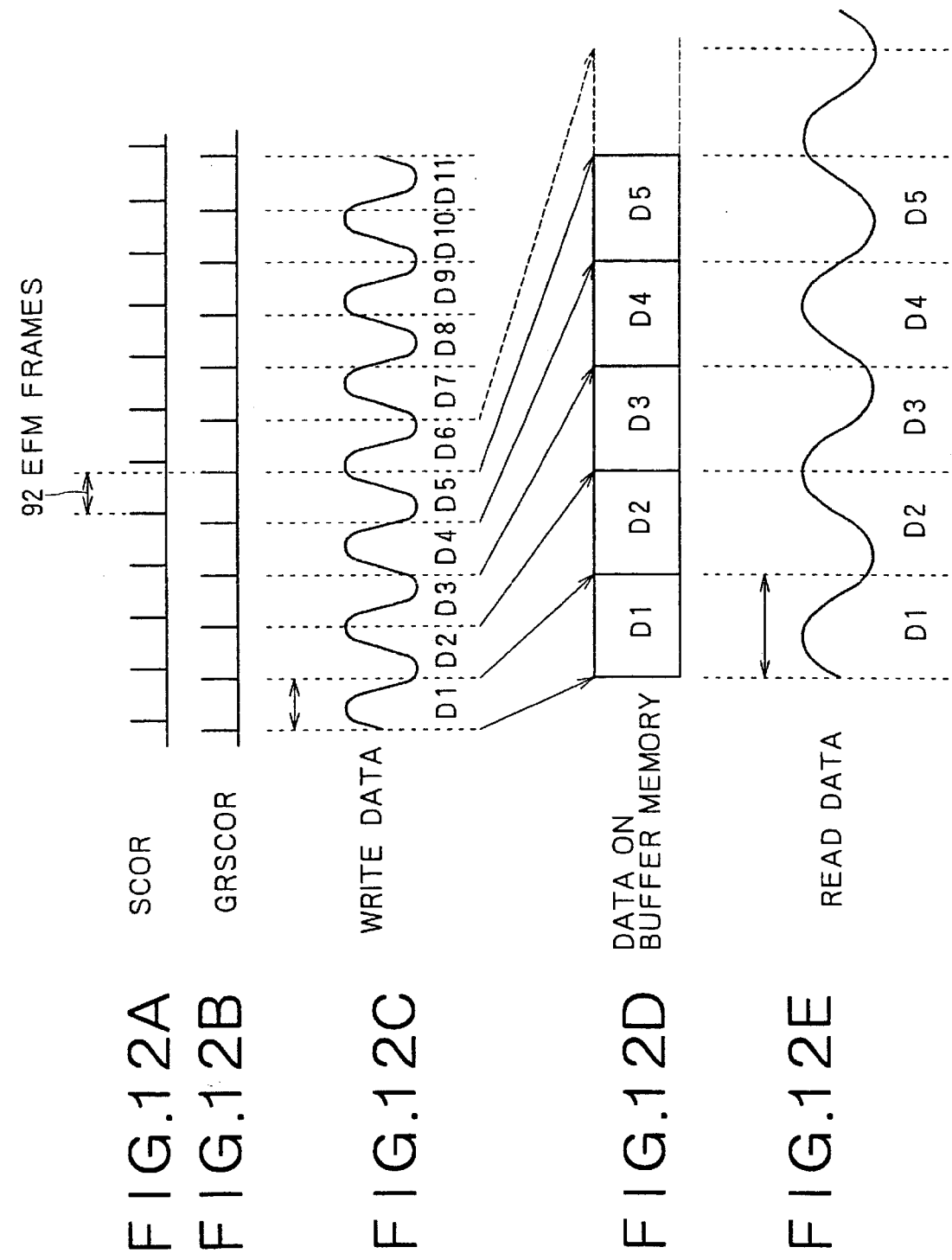

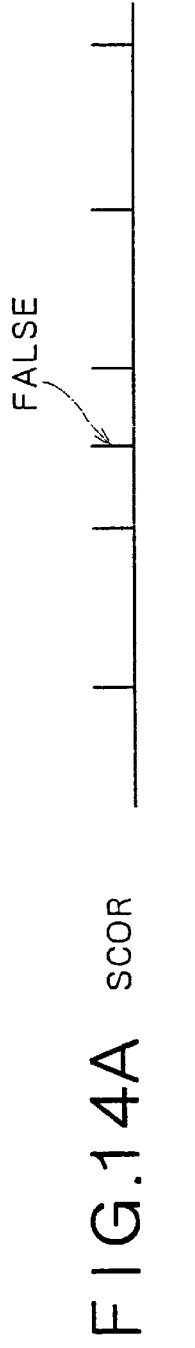
FIG.13A SCOR
FIG.13B GRSCOR
FIG.13C CRCF
FIG.14A SCOR
FIG.14B GRSCOR
FIG.14C CRCF

NORMAL WRITING

WRITING ERROR

WRITING ERROR

MEMORY CONTROL DEVICE

BACKGROUND OF THE INVENTION

The present invention relates to a memory control device incorporated in a reproducing apparatus adapted, for example, for playing a disk recording medium and for controling a data writing operation of storing data that have been read from the disk recording medium in a memory where the data are to be stored temporarily.

CD players are widely diffused in use as apparatus for reproducing audio data from a CD (Compact Disk) and outputting the reproduced data.

In a CD player, if some external disturbance such as a shock or a vibration is given thereto, it causes disorder of tracking and focus servo control, for example, and consequently generates error in reading the data. Practically, such error induces interruption of the reproduced audio signal.

In view of this problem, there are now widely available some improved CD players furnished with a shock-proof function which exhibits resistance against the external disturbance mentioned.

As is well known, in the structure of such a CD player equipped with a shock-proof function, a buffer memory is provided for temporarily storing the reproduced data obtained from a CD. The data are read out from a CD at a two-fold or higher reproduction speed, for example, and the data are written in the buffer memory at a data rate corresponding to the reproduction speed. After storage of the data by more than a predetermined quantity in the buffer memory, the data are read out from the buffer memory at a one-fold reproduction speed.

Since the data write speed to the buffer memory is higher than the read speed as described, it is customary that the data reproduction from the CD and the data writing into the buffer memory are paused when more than a predetermined quantity of the data have been written, so as not to cause overflow of the data in the buffer memory. Meanwhile, the data are read out continuously from the buffer memory. When the data stored in the buffer memory have been reduced below the predetermined quantity, the data reproduction from the CD and the data writing into the buffer memory are resumed. That is, in the reproducing apparatus equipped with a shock-proof function, reproduction of the data from the CD and writing of the reproduced data into the buffer memory are performed intermittently.

As long as the data thus reproduced intermittently from the CD are written intermittently into the buffer memory as described, it is necessary to maintain continuity of the time base information between the data written finally into the buffer memory and the data to be written thereafter into the buffer memory. If this continuity fails to be maintained, it is impossible to obtain a requisite link of the reproduced audio outputs. A control action executed for this purpose is termed sound link control or data link control, for example.

For such sound link control, channel-Q subcode data is used as a subcode inserted in audio data recorded on a CD.

As is known, CD-format audio data are composed of EFM frames, each serving as a minimum component unit, and 98 EFM frames are grouped to form one subcoding frame. Each subcoding frame is updated at an interval of 1/75 second.

A subcoding frame has subcodes of eight channels P, Q, R, S, T, U, V and W. Time base information of the audio data recorded on the CD is recorded in the channel-Q subcode data (hereinafter referred to as subQ data). The sound link control is executed by using the time base information represented by the subQ data.

FIGS. 12A to 12E conceptually show how writing into a buffer memory is controlled on the basis of such subQ data.

First, FIG. 12A shows a signal SCOR generated in a reproducing apparatus. Synchronizing signals S0 and S1 called subcode sync are inserted in a subcoding frame. This SCOR is a signal generated at the timing of detection of at least either the subcode sync S0 or S1. In the reproducing apparatus, update of the subQ data is recognized in response to the signal SCOR. Although not shown here, error detection data (CRC) relative to the subcode data is detected in the reproducing apparatus, thereby generating a signal CRCF which signifies whether or not the subQ data in the relevant subcoding frame is read properly.

FIG. 12B shows a signal GRSCOR. This signal GRSCOR is generated only in a steady generation state where a signal SCOR can be obtained continuously in synchronism with the timing of 98 EFM frames, e.g., at the timing delayed from SCOR by 92 EFM frames.

In the reproducing apparatus, the subQ data is read out in synchronism with generation of the signal SCOR, and a decision as to whether or not to execute writing into the memory in accordance with the content of the read out subQ data is made prior to the timing of the first signal GRSCOR generated after reading the subQ data. A control command is issued in accordance with the result of such a decision.

Supposing now that the data to be written into the buffer memory are such as those shown in FIG. 12C, if signals SCOR and GRSCOR are generated steadily at proper timings as shown in FIGS. 12A and 12B, then the data are written into the buffer memory sequentially as data D1→D2→D3 ... in synchronism with the signal GRSCOR, as shown in FIGS. 12C and 12D. In this case, writing is performed at a predetermined data rate higher than a one-fold speed for example.

When the data thus written are read out, the data are reproduced with the time-series continuity maintained in the order of data D1→D2→D3 ... as shown in FIG. 12D. In this case, the data are read at a rate corresponding to a one-fold speed.

It is generally known that, if any undesired condition with unstable servo control or the like is induced by some external disturbance given to the reproducing apparatus or due to some flaw or dust on the disk, the following abnormal states occur with regard to the signal SCOR which is a reference timing signal for detection of the subQ data.

One state relates to "SCOR dropout" which signifies that a signal SCOR fails to be generated at a proper timing. In this state, a signal SCOR drops out at a certain timing as shown in FIG. 13A for example. In this case, a signal GRSCOR shown in FIG. 13B is generated stably, and a signal CRCF shown in FIG. 13C also holds its high (H) level, so that the subQ data are read out properly.

To the contrary, there may occur a state of "false SCOR" where a signal SCOR is generated at an improper timing, as shown in FIG. 14A for example. Here, a signal GRSCOR is outputted steadily as shown in FIG. 14B, but a signal CRCF of FIG. 14C is turned to its low (L) level at the timing of generation of a false SCOR, so that the subQ data corresponding to the false SCOR is not read out correctly.

Although unshown, there may further occur another state of "subQ data dropout" where the subQ data fails to be read out even with generation of the signal SCOR.

In case the three states mentioned above have occurred, if such states are merely transient as shown in FIGS. 13 and 14, data writing into the buffer memory and sound link control are executed substantially correctly in most cases. However, if at least one of these three states is continuous to a certain extent, then it becomes impossible in the reproducing apparatus to make a proper decision as to whether "SCOR dropout" or "false SCOR" has really occurred or not. As a result, it induces malfunction such that the data to be written essentially into the buffer memory are not written, or the data not to be written therein are written erroneously.

Assume here that, in a normal state, data D1 to D7 are written successively into the buffer memory as shown in FIG. 15A. If the aforementioned malfunction is caused, data writing into the buffer memory may be performed in such a manner that, for example, the data D3 to be written essentially drops out as shown in FIG. 15B. Another example is such as shown in FIG. 15C where the data D3 is written in duplicate. More specifically, the data D4 needs to be written next to the preceding data D3 in a normal state, but actually the data D3, which is not to be written at this time point, has already been written therein.

If such erroneous data writing link is executed, the reproduced data output comes to have an incorrect waveform shown in FIG. 15B or 15C instead of a correct waveform shown in FIG. 15A, hence impairing the data reproduction fidelity.

SUMMARY OF THE INVENTION

In view of the problems described above, it is an object of the present invention to provide an improved memory control device which enables proper writing of reproduced data from a recording medium into a buffer memory despite some instability of the reproduction state, thereby ensuring satisfactory fidelity of the reproduced data.

According to one aspect of the present invention, there is provided a memory control device capable of controlling data writing into a memory means where the data reproduced from a disk recording medium are stored temporarily.

The memory control device comprises a signal generation means for generating a stable sync detection signal which is obtained at a normal detection timing of a synchronizing signal in response to a sync detection signal generated by detection of the synchronizing signal inserted in the reproduced data per predetermined data unit. The memory control device further comprises a data writing control means capable of reading out time base information inserted per predetermined data unit in synchronism with the timing of generation of the stable sync detection signal, and also capable of controlling the data writing into the memory means on the basis of the time base information thus read.

In this structure, a stable sync detection signal which is generated substantially at the same timing as that of a normal sync detection signal and is maintained in a better state of generation steadier than that of the sync detection signal can be generated. Due to execution of reading the time base information on the basis of the generation timing of such stable sync detection signal, it becomes possible to read out the time base information always at the proper timing regardless of some unsteady state of the actual sync detection signal.

The above and other features and advantages of the present invention will become apparent from the following description which will be given with reference to the illustrative accompanying drawings.

BRIEF DESCRIPTION OF THE DRAWINGS

FIGS. 10A and 10B are explanatory diagrams showing the composition of a subcoding frame and that of subQ data in the subcoding frame, respectively;

FIGS. 11A and 11B are explanatory diagrams showing the defined contents of subQ data;

FIGS. 12A to 12E are explanatory diagrams typically showing an operation of controlling data writing into a buffer memory in the prior art;

FIGS. 13A to 13C are timing charts typically showing dropout of SCOR;

FIGS. 14A to 14C are timing charts typically showing generation of false SCOR.

DESCRIPTION OF THE PREFERRED EMBODIMENTS

Hereinafter some preferred embodiment of the present invention will be described in detail with reference to the accompanying drawings. The present embodiment represents a reproducing apparatus which is adapted for reproduction of data from a CD-DA (Compact Disk-Digital Audio) and has a shock proof function with a buffer memory where the data reproduced from a CD are stored temporarily.

A description thereof will be given in the following order.

1. Subcoding format
2. Reproducing apparatus
2-1. Whole structure
2-2. Address control in buffer memory
2-3. Memory control signal generation circuit
3. Memory control
1. Subcoding format First, a CD-DA subcoding format will be explained below.

As is well known, a minimum unit of data recorded on a CD-DA is a frame. More accurately, this frame is termed "EFM (Eight-to-Fourteen Modulation) frame". 98 EFM frames constitute one subcoding frame.

Figure 9:
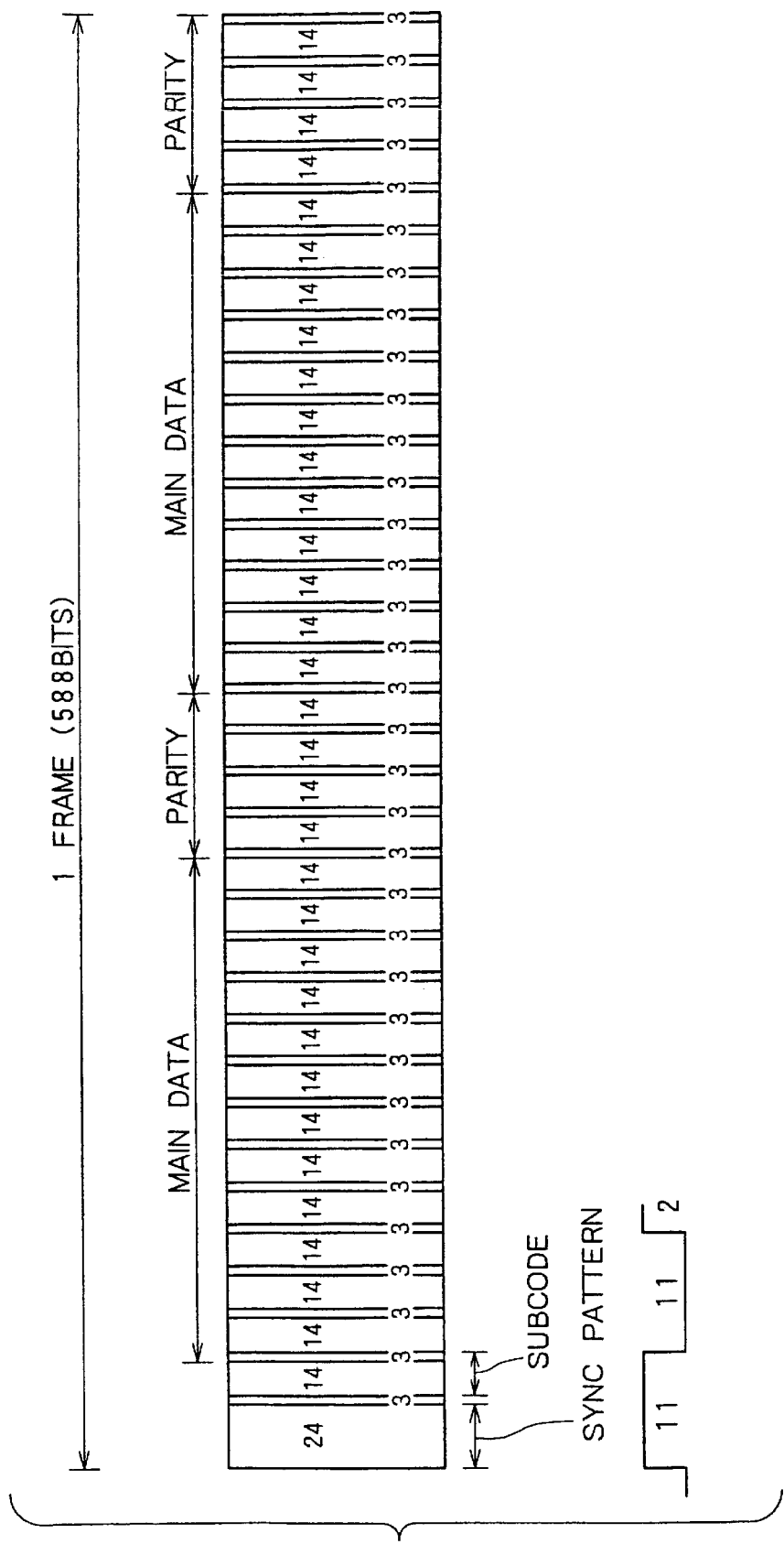
FIG. 9 is an explanatory diagram showing the composition of an EFM frame.

FIG. 9 shows the composition of one EFM frame.

One frame is composed of 588 bits, which include the top 24 bits forming a sync pattern of 11T+11T+2T (i.e., 3 inversions), succeeding 14-bit EFM words, and 3 margin bits interposed between adjacent EFM words.

In this example, 14 bits next to the sync pattern form a subcode area, and a main data area and a parity area are disposed posterior thereto, as shown in FIG. 9.

One subcoding frame is constituted of 98 EFM frames having the above composition, and subcode data obtained from 98 EFM frames are grouped as shown in FIG. 10A to thereby constitute one subcoding frame.

Subcode data from the 1st and 2nd frames (frame 98n+1, frame 98n+2) in the total 98 EFM frames are used as sync patterns, wherein a sync pattern of the 1st frame is defined as S0, and a sync pattern of the 2nd frame is defined as S1. The 3rd to 98th frames (frame 98n+3 to frame 98n+98) form channel data each composed of 96 bits, i.e., subcode data of channels P, Q, R, S, T, U, V and W.

Channels P and Q are used for management of access and so forth. However, channel P shows merely a pause portion between tracks, and finer control is executed by channel Q (Q1 to Q96). The 96-bit data of channel Q (subQ data) are so composed as shown in FIG. 10B.

The data of channels R to W are used to form text data groups, of which explanation is omitted here.

In FIG. 10B, four bits of Q1 to Q4 serve as control data and are used to identify the number of audio channels, emphasis, CD-ROM and so forth.

That is, the 4-bit control data are defined as follows.

0*** . . . 2-channel audio
1*** . . . 4-channel audio
*0** . . . CD-DA
*1** . . . CD-ROM
**0* . . . digital copy not permitted
**1* . . . digital copy permitted
***0 . . . with preemphasis
***1 . . . without preemphasis Next, 4 bits of Q5 to Q8 are used as an address and serve as control bits for subQ data.

When these 4 address bits are 0001, it signifies that succeeding subQ data Q9 to Q80 are audioQ data. Meanwhile, when the 4 bits are 0100, it signifies that the succeeding subQ data Q9 to Q80 are videoQ data.

Next, 72 bits of Q9 to Q80 are used as subQ data, and the remaining bits of Q81 to Q96 are used as CRC.

In a lead-in area, subQ data recorded therein serve as TOC information (management information).

That is, the 72-bit subQ data Q9 to Q80 in the channel Q data read from the lead-in area have the information shown in FIG. 11A. Each of the subQ data is composed of 8 bits.

First, a track number is recorded. In the lead-in area, the track number is set fixedly to 00.

Subsequently, POINT (point) is recorded, and then MIN (minute), SEC (second) and FRAME (frame number) are indicated as an elapsed time in the track.

Further, PMIN, PSEC and PFRAME are recorded. The meanings of such PMIN, PSEC and PFRAME are determined by the value of POINT as follows.

When the value of POINT is any of 01h to 99h (where h denotes hexadecimal notation), it signifies the track number. In PMIN, PSEC and PFRAME, the start point (absolute time address) of the track of the relevant track number is recorded as minute (PMIN), second (PSEC) and frame number (PFRAME).

When the value of POINT is A0h, the track number of the first track is recorded in PMIN. The value of PSEC discriminates among CD-DA, CD-I and CD-ROM (XA specifications).

When the value of POINT is A1h, the track number of the last track is recorded in PMIN.

When the value of POINT is A2h, the start point of a lead-out area is recorded as an absolute time address in PMIN, PSEC and PFRAME.

In tracks #1 to #n where data of music or the like are actually recorded and in the lead-out area on a CD, the subQ data recorded therein have the information indicated in FIG. 11B.

First a track number is recorded. That is, in each of tracks #1 to #n, one value of 01h to 99h is recorded as the relevant number. In the lead-out area, the track number is AAh.

Subsequently, information for further subdividing each track is recorded as an index.

Then MIN (minute), SEC (second) and FRAME (frame number) are indicated as an elapsed time in the track.

Further AMIN, ASEC and AFRAME representing an absolute time address are recorded as minute (AMIN), second (ASEC) and frame number (AFRAME).

The TOC and subcode are thus formed. It is understood that each address represented by AMIN, ASEC and AFRAME on the disk is recorded in a unit of 98 frames.

One block consisting of 98 frames is termed a subcoding frame, and 75 subcoding frames are included in one second as audio data. That is, AFRAME in an address can take a value out of 0 to 74.

In the present embodiment, continuity of data is checked in accordance with the absolute time address (time base information) in the subQ data shown in FIG. 11B. Therefore, such a data continuity check is executed in units of subcoding frames, which corresponds in time to $\frac{1}{75}$ second.

2. Reproducing apparatus 2-1. Whole structure

Figure 1:
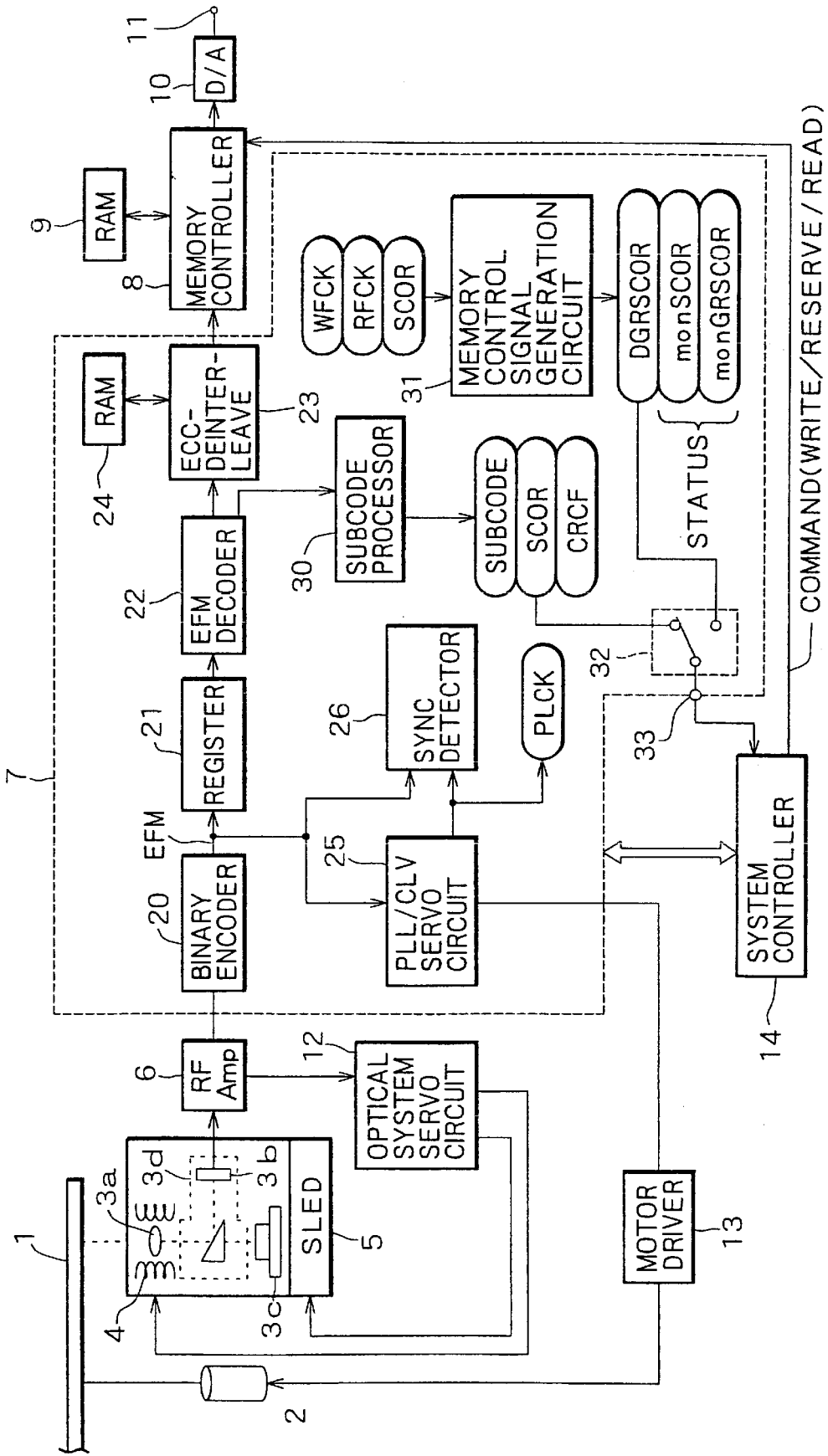
FIG. 1 is a block diagram showing the structure of a reproducing apparatus as an embodiment of the present invention.

FIG. 1 is a block diagram showing the whole internal structure of the reproducing apparatus in the present embodiment.

It is supposed in this diagram that a disk 1 conforms with the CD-DA format, and information is read out by an optical head 3 from the disk 1 which is driven and rotated by a spindle motor 2 at a constant linear velocity (CLV). A laser beam is irradiated from the optical head 3 onto the disk 1, and the information recorded in the shape of pits on the disk 1 is read out by means of the reflected beam.

In order to perform an operation of reading out the data from the disk 1 as mentioned above, the optical head 3 is equipped with a laser diode 3c for emitting a laser output, an optical system 3d consisting of a polarized beam splitter and a ¼ wavelength plate, an objective lens 3a serving as a laser output end, and a detector 3b for detecting the reflected beam.

The objective lens 3a is held by a biaxial mechanism 4 in a manner to be shiftable in the radial direction of the disk (tracking direction) and also in directions toward and away from the disk. The whole optical head 3 is movable by a sled mechanism 5 in the radial direction of the disk.

The information detected from the disk 1 by the reproducing operation of the optical head 3 is supplied to an RF amplifier 6. In this case, the RF amplifier 6 amplifies the input information and executes required calculations and so forth, thereby outputting a reproduced RF signal, a tracking error signal and a focus error signal.

An optical system servo circuit 12 generates various servo driving signals in accordance with the tracking error signal and the focus error signal supplied from the RF amplifier 6, and also in accordance with a tracking jump command, an access command and so forth obtained from a system controller 14, and then controls the biaxial mechanism 4 and the sled mechanism 5 to thereby execute focus and tracking control.

The reproduced RF signal obtained in the RF amplifier 6 is supplied to a binary encoder 20 in a signal processor 7, so that a binary-coded EFM signal (eight-to-fourteen modulation signal) is outputted. This signal is supplied to a register 21, a PLL/CLV servo circuit 25 and a sync detection circuit 26.

Meanwhile the tracking error signal and the focus error signal are supplied to the optical system servo circuit 12.

The EFM signal supplied from the binary encoder 20 via the register 21 to an EFM decode circuit 22 is processed through EFM demodulation. That is, fourteen-to-eight demodulation is executed here. The EFM demodulated data obtained from the EFM decode circuit 22 are supplied to an ECC/deinterleave processing circuit 23, which then executes error correction and deinterleave processing while writing the data in and reading the same from a RAM 24 at predetermined timings. The data thus processed through error correction and deinterleaving in the ECC/deinterleave processing circuit 23 are supplied to a memory controller 8 which will be described later.

A subcode processor 30 receives the data outputted from the EFM decode circuit 22, and then extracts the data in a unit of subcoding frame having the composition of FIG. 10A for example. The data thus extracted are read by the system controller 14 for example, so as to be used for various control actions including control of writing into a buffer memory 9, which will be mentioned hereinafter. Further, error detection is executed with regard to the subcode data by utilizing CRC inserted as shown in FIG. 10B for example. If no error exists, a high level is outputted as a signal CRCF. Meanwhile, if there exists any error, a low level is outputted.

In the subcode processor 30, it is possible to output a signal SCOR at the detection timing of either sync pattern S0 or S1 of a subcoding frame for example. In the present embodiment, the signal SCOR is supplied to a memory control signal generation circuit 31, mentioned hereinafter, which generates various required signals.

The memory control signal generation circuit 31, whose internal structure will be described later, finally generates and outputs a signal DGRSCOR, a signal monSCOR and a signal monGRSCOR required to perform the memory control operation which is the feature of the present embodiment. In the memory control signal generation circuit 31, there is also generated a signal GRSCOR by inputting and utilizing for example clock WFCK, clock RFCK and signal SCOR. Clock WFCK is synchronized with each EFM frame reproduced correspondingly to the present rotation speed of the disk 1, and it can be obtained in accordance with a clock PLCK for example. Clock RFCK is synchronized with an EFM frame sync obtained from an unshown crystal oscillator, and is used as a clock in a D/A converter for example.

The signals (DGRSCOR, monSCOR and monGRSCOR) outputted from the memory control signal generation circuit 31 are supplied to the system controller 14 so as to be used for data writing control which is executed by the system controller 14 with regard to the buffer memory 9.

The signal SCOR generated in the subcode processor 30 is delivered from an SCOR output terminal 33 of the signal processor 7. In the present embodiment, as shown in the diagram, the signal to be delivered from the SCOR output terminal 33 is switched to select either the signal SCOR or the signal DGRSCOR generated in the memory control signal generation circuit 31. Such selection is executed by means of a switch 32, which is selectively actuated under control by the system controller 14 in accordance with the state of the signal monGRSCOR.

A PLL/CLV servo circuit 25 receives the EFM signal supplied from the binary encoder 20 and operates a PLL circuit to thereby output a signal PLCK which serves as a reproduction clock synchronized with the EFM signal. This signal PLCK is used as a master clock which is a processing reference clock in the signal processor 7. Therefore, the operation timing of the signal processing line in the signal processor 7 conforms with the rotation speed of the spindle motor 2. In a state where the PLL circuit is locked while the disk 1 is driven at an n-fold speed under CLV condition, the frequency of this signal PLCK becomes n×4.3218 MHz for example.

In the PLL/CLV servo circuit 25, a CLV servo signal is produced for CLV control by utilizing the input EFM signal and the signal obtained due to the operation of the PLL circuit, and then is supplied to a motor driver 13. The internal structure of the PLL/CLV servo circuit 25 will be described later.

The motor driver 13 generates a motor driving signal in response to the CLV servo signal supplied from the PLL/CLV servo circuit 25 and then supplies the motor driving signal to the spindle motor 2, thereby driving the spindle motor 2 to rotate the disk at a constant linear velocity.

A sync detector 26 detects a frame sync from the EFM signal received from the binary encoder 20 while using, as a reference clock, the signal PLCK inputted from the PLL/CLV servo circuit 25. As shown previously in FIG. 9, top 24 bits in a total of 588 bits constituting one EFM frame are used as a sync pattern. This sync pattern is a fixed one formed with continuous inversion intervals of 11T, 11T and 2T as shown in the diagram.

The sync detector 26 further executes other processes of frame sync interpolation, window protection and so forth when there occurs lack of any frame sync pattern in the data due to dropout or jitter or when the same frame sync pattern is detected. The register 21 operates in accordance with the output of the sync detector 26.

The data outputted from the ECC/deinterleave processing circuit 23 in the signal processor 7 as mentioned above are digital audio data conforming with 16-bit quantization and 44.1 KHz sampling. Such digital audio data are supplied to the memory controller 8.

In the present embodiment, the spindle motor 2 is rotated under control in a speed range higher than a one-fold speed, so that the processing in the signal processor 7 is executed at a rate higher than a one-fold rate in accordance with the rotation speed of the spindle motor 2. The digital audio data outputted from the signal processor 7 at the higher rate are written and stored in the buffer memory 9 under control of the memory controller 8. Meanwhile, reading the data from the buffer memory 9 is executed at an ordinary rate under control of the memory controller 8. The data are converted into an analog signal by the D/A converter 10 so that the audio signals delivered from the audio output terminal 11 are those obtained at the ordinary pitch and speed.

The system controller 14 is equipped with a microcomputer and so forth, and executes control processes in accordance with required operations to be performed by individual function circuits which constitute the reproducing apparatus.

Although component portions corresponding to the user interface function such as a manipulator, a display and so on are not shown in the diagram, it is a matter of course that such component portions may actually be included in the constitution.

2-2. Address control in buffer memory

Actual addressing to the buffer memory 9 for writing and reading is performed in the following manner.

Figure 8:
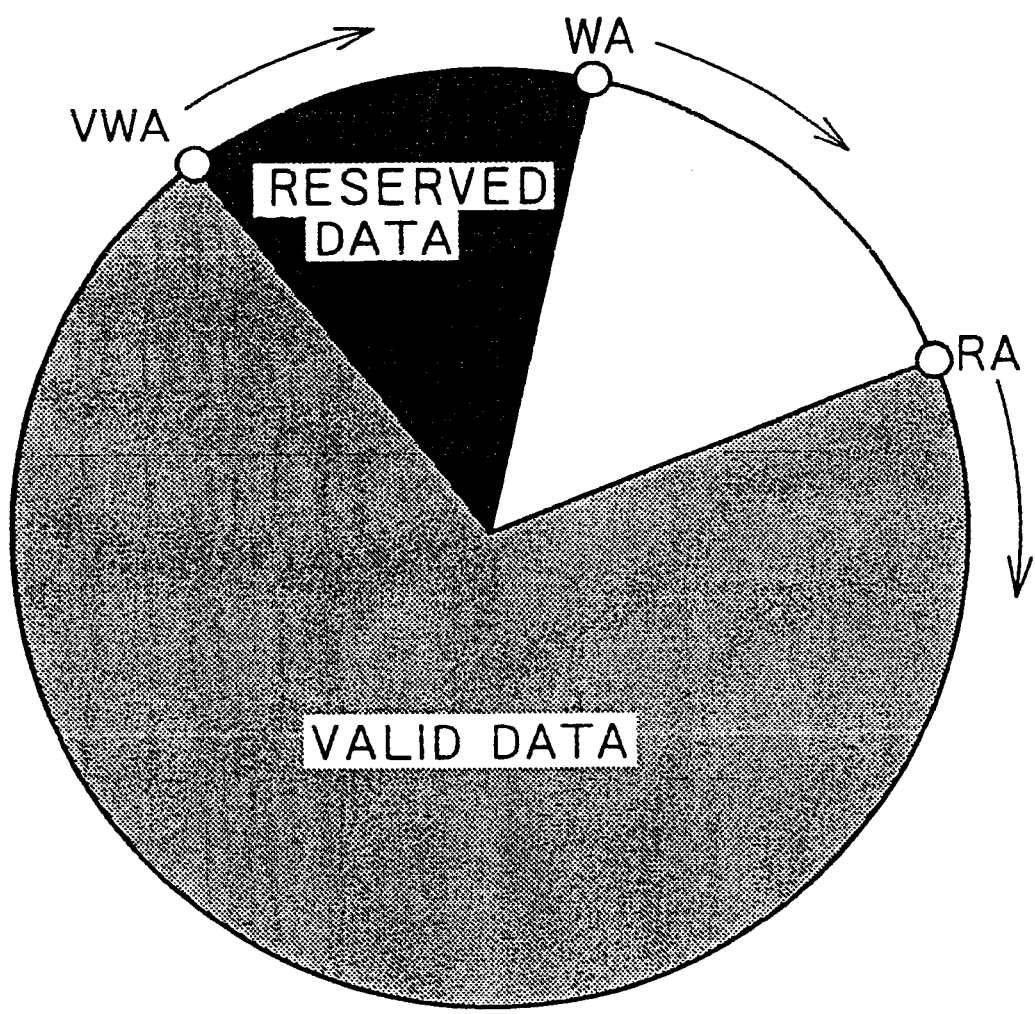
FIG. 8 is a diagram for explaining addresses in the buffer memory.

Practically, the buffer memory 9 has a ring buffer structure as shown in FIG. 8 for example.

Addresses for accessing the data in the buffer memory 9 consist of read address RA and write address WA. As described above, writing the data into the buffer memory 9 is executed at a rate higher than the reading rate, and the write address WA precedes the read address RA at a speed higher than the read speed corresponding to the one-fold data rate.

Depending on a verified address VWA, the data stored in an area from the read address RA to the address specified by the verified address VWA indicate effective valid data written properly. In contrast therewith, the data held in an area from the verified address VWA to the write address WA are handled as "reserved data" which are not verified to be proper.

More specifically, the data written into the buffer memory 9 are not always normal exactly, and therefore it is necessary to confirm that the data are normal with respect to time base continuity.

For this purpose, the absolute time address of the subcode (subQ data) is checked in the system controller 14, whereby the data written until then are confirmed. After confirmation of the normality, the verified address VWA is advanced up to the position of the confirmed data, and the data are taken into the internal register.

For example, in a state where proper writing and reading of the data into and from the buffer memory 9 are executed exactly, the write address WA comes to catch up with the read address RA at a certain time point. This indicates that the buffer memory 9 is full of the stored data, and consequently the data writing is inhibited. Then, only the data reading is still executed continuously, and when more than a predetermined vacant area has been formed in the buffer memory 9, the data writing is permitted again.

When the read address RA has caught up with the verified address VWA, the effective valid data no longer exists, and therefore the data reading is inhibited.

Thus, reproduction of the data from the disk 1 and writing thereof into the buffer memory 9 are performed intermittently in the present embodiment. That is, data writing is interrupted when the buffer memory 9 is full of the stored data or when the servo control is upset to be out of order due to any dust on the disk, defect such as a flaw thereof, or some external disturbance.

It will be understood from the above description that, in execution of writing again, link of the time base needs to be attained with regard to the data held already in the buffer memory 9. For this purpose, when the system controller 14 starts data writing, its operation returns to the final verified address VWA and executes an access to the disk position corresponding to the verified address VWA. Then the subQ data reproduced from the accessed position are read out at a predetermined timing which will be mentioned later, and if this position coincides with the verified address, a command is transmitted to the memory controller 8 to start the data writing.

2-3. Memory control signal generation circuit

As explained earlier in connection with the known example of the prior art, when permission or inhibition of data writing into the buffer memory 9 is controlled on the basis of the result of reading the subQ data with reference to the timing of appearance of the signal SCOR, it is highly probable that data link control on the buffer memory 9 fails in a state where the signal SCOR is not detected properly due to instability of the servo control condition for example.

In view of such a problem, the present embodiment is so contrived as to realize proper execution of data link control even in the undesired state mentioned above, hence enhancing the data reproduction fidelity. For this purpose, there are generated signals DGRSCOR, monSCOR and monGRSCOR which have not been existent heretofore in the prior art. The system controller 14 controls the data writing into the buffer memory 9 by the use of such signals.

The memory control signal generation circuit 31 provided in the reproducing apparatus of FIG. 1 is a circuit for generating signals DGRSCOR, monSCOR and monGRSCOR. Now the internal structure of this memory control signal generation circuit 31 will be described below with reference to a block diagram of FIG. 2. When necessary, an explanation of FIG. 2 will be given with reference to a timing chart of FIG. 3.

Figure 2:
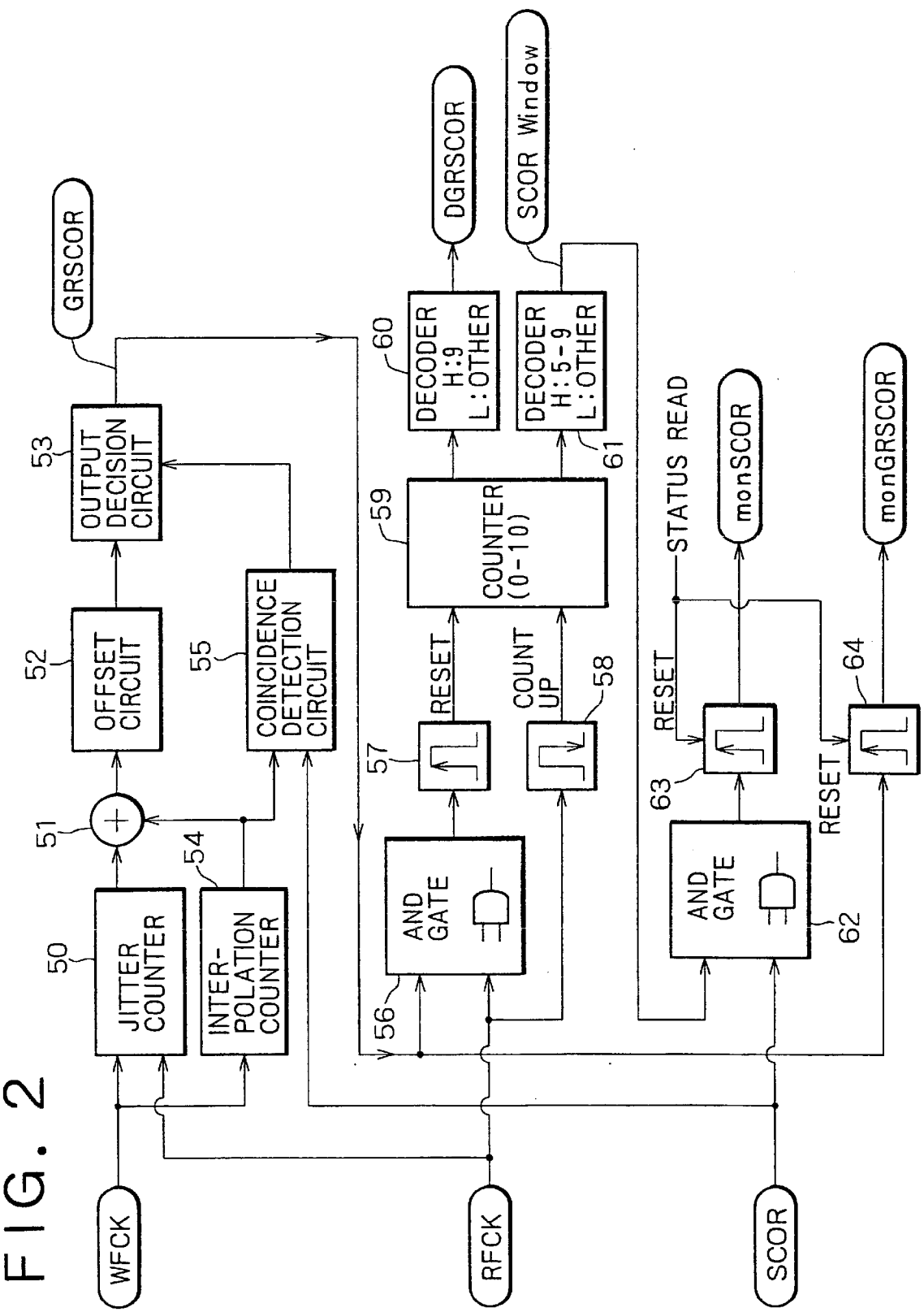
FIG. 2 is a block diagram showing an exemplary internal structure of a memory control signal generation circuit.
Figure 3:
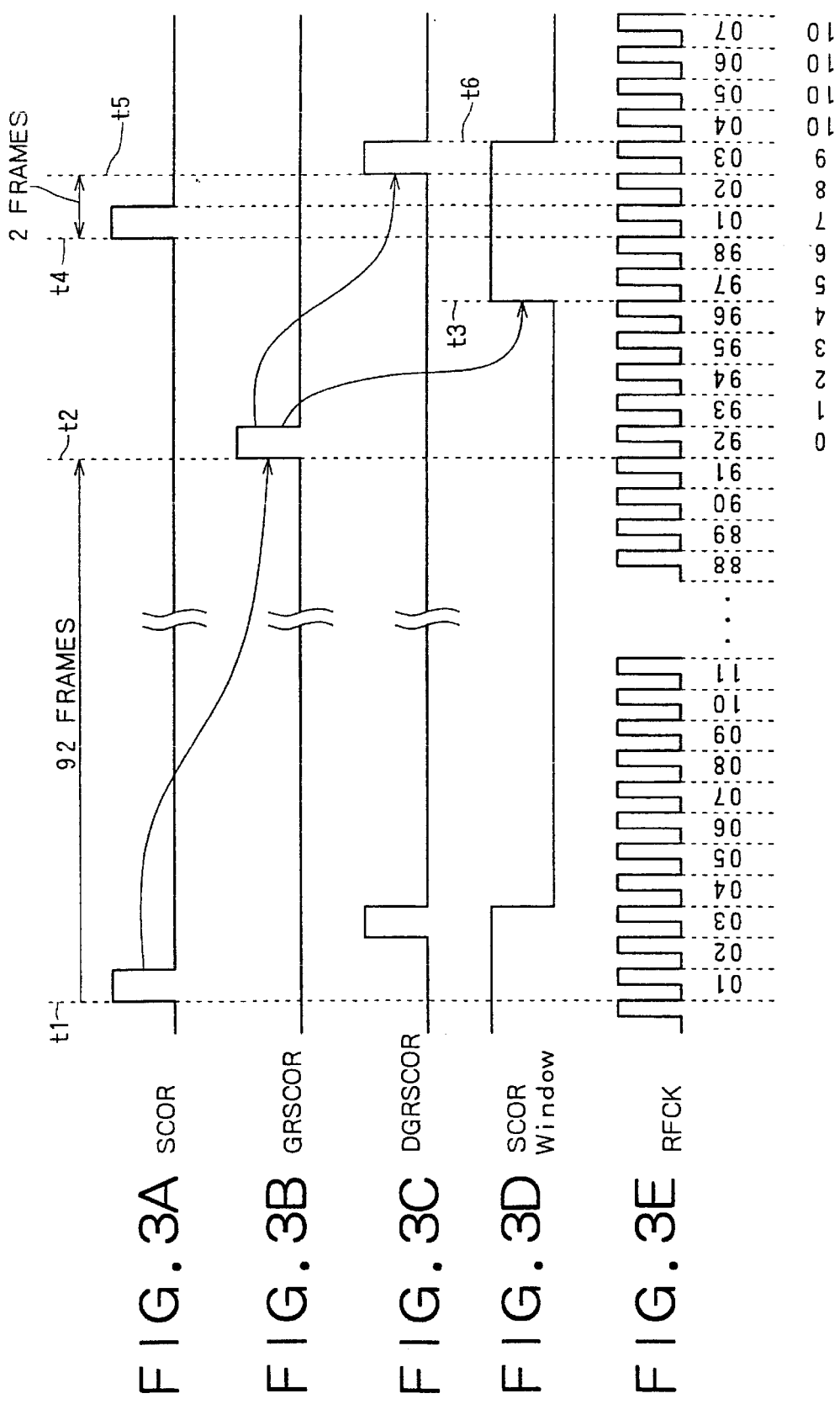
FIGS. 3A to 3E are timing charts to generate signals GRSCOR, DGRSCOR and SCOR Window in the memory control signal generation circuit.

In FIG. 2, a jitter counter 50 receives clock pulses WFCK and RFCK. As described already, WFCK is a clock synchronized with the frame period of reproduced data, and RFCK is a frame period clock having an exact timing and generated on the basis of an oscillation output signal from a crystal oscillator as shown in FIG. 3E. The clock pulse WFCK is branched and inputted also to an interpolation counter 54.

The timing of the signal GRSCOR to be outputted finally from an output decision circuit 53 is predicted according to the jitter counter 50 and the interpolation counter 54. Normally, no jitter is caused in the clock WFCK or RFCK. However, when the rotation speed of the spindle motor is accelerated or decelerated due to external disturbance or the like, the signal SCOR may possibly be generated at a point different from the proper timing of generation within a marginal range for example. In this case, such a timing lag of generation is induced also with regard to the signal GRSCOR generated as will be described later.

In order to avoid this disadvantage, the clock pulses WFCK and RFCK are inputted to the jitter counter 50 and the calculator 51, which then count the jitter (number of clock pulses) to thereby predict the acceleration or deceleration corresponding to the number of EFM frames for example. The interpolation counter 54 counts the clock pulses WFCK by the number corresponding to 98 frames, hence attaining synchronism with the jitter counter 50.

The calculator 51 calculates the difference between the number of clock pulses WFCK and RFCK counted by the jitter counter 50 in the 98-frame period obtained from the interpolation counter 54. The output of this calculator 51 is handled as a predictive value relative to the generation timing of the signal GRSCOR.

Subsequently the output of the calculator 51 is supplied to an offset circuit 52, which then produces a value by adding 92 frames to the output of the calculator 51. This value is supplied to the output decision circuit 53.

A coincidence detection circuit 55 receives both the signal SCOR obtained as shown in FIG. 3A and the timing signal of the 98-frame period outputted from the interpolation counter 54. The pulse duration of the signal SCOR is equal in length to, e.g., one period of the EFM frame.

In the coincidence detection circuit 55, the timing of the signal outputted from the interpolation counter 54 is compared with the timing of the pulse signal SCOR to check a coincidence therebetween, hence detecting that the signal SCOR is generated at an interval of 98 frames. In this case, a detection signal is outputted in response to two successive detections of the signal SCOR generated at an interval of 98 frames.

The detection signal obtained from the coincidence detection circuit 55 is supplied as a trigger to the output decision circuit 53, which then outputs a high-level pulse of a duration corresponding in length to one period of the clock RFCK. This pulse serves as a signal GRSCOR.

According to the circuit configuration mentioned above, when the signal SCOR generated at a 98-frame interval has been detected twice in succession, a signal GRSCOR is generated for the first time after 92 frames from the second generation of the signal SCOR. That is, if the signal SCOR generated at time point t1 in FIG. 3A is the second successive signal SCOR generated at a 98-frame interval, then a signal GRSCOR is generated first at time point t2 after 92 frames from t1, as shown in FIG. 3B.

In such a circuit configuration, a pulse is delivered from the output decision circuit 53 at an interval of 98 frames subsequently to the first output of the signal GRSCOR. Therefore, a signal GRSCOR is outputted stably at a 98-frame interval despite any temporary dropout of the signal SCOR or despite generation of false SCOR.

This signal GRSCOR is branched and inputted to both an AND gate 56 and a rise detector 64.

The AND gate 56 takes a logical product of the signal GRSCOR and the clock RFCK, and then supplies its output to the rise detector 57. The output of the rise detector 57 is delivered to a RESET terminal of a counter 59, which is thereby reset in accordance with the timing correction of the signal GRSCOR by the clock RFCK.

The clock RFCK is supplied as a count signal to the counter 59 via a fall detector 58, so that the counter 59 counts a value of 0 to 10 in decimal notation, for example, at each fall of the clock RFCK, starting from the timing of generation of the signal GRSCOR.

Subsequently, the output of the counter 59 is supplied to decoders 60 and 61.

The decoder 60 delivers a high-level output only when the counted value from the counter 59 is 9, or delivers a low-level output in the case of any other counted value. The output of the decoder 60 serves as a signal DGRSCOR. As shown in FIG. 3C for example, this signal DGRSCOR is generated at time point t5 after 9 frames from the timing of the generation of the signal GRSCOR at time point t2.

Since this signal DGRSCOR is also obtained on the basis of the signal GRSCOR, it is stabler than the signal SCOR for example and is generated periodically at an interval of 98 frames.

As obvious from comparison of the generation timing of the signal DGRSCOR at time point t5 in FIG. 3C with that of the signal SCOR at time point t4 in FIG. 3A for example, the signal DGRSCOR is generated after a lapse of 2 frames from the signal SCOR. That is, the signal DGRSCOR is generated almost immediately after the signal SCOR, and therefore these signals can be regarded as pulse signals generated correspondingly to the detection timing of the sync pattern S0 or S1.

In the present embodiment, the signal DGRSCOR thus obtained is used instead of the signal SCOR in the system controller 14. More specifically, upon a decision by the system controller 14 that the signal DGRSCOR has been obtained stably due to stability of the servo control, for example, a command is outputted to the signal processor 7, for example, to change the switch 32, whereby the signal DGRSCOR is delivered from the SCOR output terminal 33 instead of the signal SCOR. The system controller 14 starts reading the subQ data in accordance with the generation timing of the signal DGRSCOR.

Referring back to FIG. 2, the output of the counter 59 already mentioned is also supplied to the decoder 61, which then delivers a high-level output only when the counted value is in a range of 5 to 9, or delivers a low-level output in the case of any other counted value.

Accordingly, a high-level signal is outputted from the decoder 61 in a duration of t3 to t6 which is posterior by 5 to 9 frames to the generation timing of the signal GRSCOR at time point t2 in FIG. 3B for example. This high-level signal becomes SCOR Window shown in FIG. 3D. In generating a signal monSCOR as will be described later, the signal SCOR Window serves as a window which is generated in accordance with the generation timing of a regular signal SCOR so as to prevent malfunctions such as a signal monSCOR generated erroneously by detection of a false signal SCOR. In this case, as is obvious from comparison of the timings in FIGS. 3D and 3A, a high-level signal is generated anterior and posterior by 2 frames to the generation timing of the signal SCOR.

The signal SCOR Window is supplied to an AND gate 62, which then takes and outputs a logical product of the signal SCOR Window and another input signal SCOR. That is, a high-level output is delivered when a pulse signal SCOR is obtained while the window is open with the signal SCOR Window having a high level.

The output of the AND gate 62 is supplied to a rise detector 63, which then delivers a high-level output at the timing of its rise. This output becomes a signal monSCOR, wherein a high level indicates generation of a signal SCOR at a proper timing, and a low level indicates no generation of a signal SCOR.

The rise detector 63 is reset in response to input of a signal Status Read. This signal Status Read signifies a timing when the system controller 14 starts reading a signal Status from the signal processor 7, wherein the signal Status denotes a signal monSCOR and a signal monGRSCOR outputted from the memory control signal generation circuit 31.

That is, the signal monSCOR is a pulse which is turned to a high level when a signal SCOR is generated at a proper timing, or is turned to a low level when the system controller 14 requests a signal Status Read at the generation timing of the signal DGRSCOR, as will be mentioned later.

The signal GRSCOR supplied to a rise detector 64 is turned to a high level in response to detection of the rise of this pulse signal. This pulse signal is also reset to a low level when the system controller 14 requests a signal Status Read. The output of the rise detector 64 becomes a signal monGRSCOR.

Therefore, the signal monGRSCOR is obtained as a pulse which rises to a high level during a predetermined period at the generation timing of the signal GRSCOR, and its high level indicates generation of the signal GRSCOR.

In this manner, the memory control signal generation circuit 31 generates and outputs such signals DGRSCOR, monSCOR and monGRSCOR. For the purpose of confirmation, the definitions of such signals will be described below.

[Signal DGRSCOR]

This signal is generated with a delay of, e.g., 9 frames from the signal GRSCOR as a reference.

For example, the signal SCOR is prone to be affected harmfully by defects of a disk or external disturbance which eventually induce SCOR dropout or generation of false SCOR signals relatively frequently, but the signal GRSCOR can be generated stably at a predetermined interval without being affected by defects or disturbances to some extent. Consequently, the signal DGRSCOR generated on the basis of such a signal GRSCOR is also rendered stable and free from being affected by external disturbances, differently from the signal SCOR.

A switched output signal is selectively delivered from the SCOR output terminal 33, which is used originally for delivering the signal SCOR, in response to a command received from the system controller 14. When the servo control condition has been stabilized to a certain degree, as described above, the system controller 14 employs, instead of the signal SCOR, the signal DGRSCOR as a trigger for reading out the subQ data.

[Signal monGRSCOR]

This signal indicates, by a high level thereof, generation of the signal GRSCOR. The system controller 14 reads out the signal monGRSCOR, which represents Status, at the generation timing of the signal DGRSCOR (or signal SCOR), thereby recognizing whether or not the signal GRSCOR has been generated within a time period from generation of the preceding signal DGRSCOR (or SCOR) to generation of the current signal DGRSCOR (or SCOR).

If the signal monGRSCOR has a high level, there is attained reliability with regard to generation of the signal DGRSCOR produced on the basis of the signal GRSCOR. Then, in response to the signal monGRSCOR, the system controller 14 transmits a command for switching the output signal, which is to be delivered from the SCOR output terminal 33, from the signal SCOR to the signal DGRSCOR.

[Signal monSCOR]

This signal indicates, by a high level thereof, generation of the signal SCOR. The system controller 14 monitors the state of the signal monSCOR obtained as Status also when using the signal DGRSCOR as a reference timing to read out the subQ data, hence making a decision as to whether or not the actual subQ data are to be read.

3. Memory control

Next, a description will be given on the writing control (sound link control) to the buffer memory 9 of the system controller 14 in the present embodiment. The writing control in the present embodiment is executed by a command issued from the system controller 14 to the memory controller 8 by utilizing the Status (signal monSCOR, monGRSCOR) and the signal DGRSCOR generated in the memory control signal generation circuit 31 and outputted therefrom. Various commands issued from the system controller 14 to the memory controller 8 will be described one by one as needed, in the following explanation.

Control actions executed for the buffer memory 9 are divided generally into three relative actions of writing in the buffer memory, reading therefrom, and access thereto. Since the features in the present embodiment are concerned with the two actions of accessing and writing in the buffer memory, such control actions will be described below.

Figure 4:
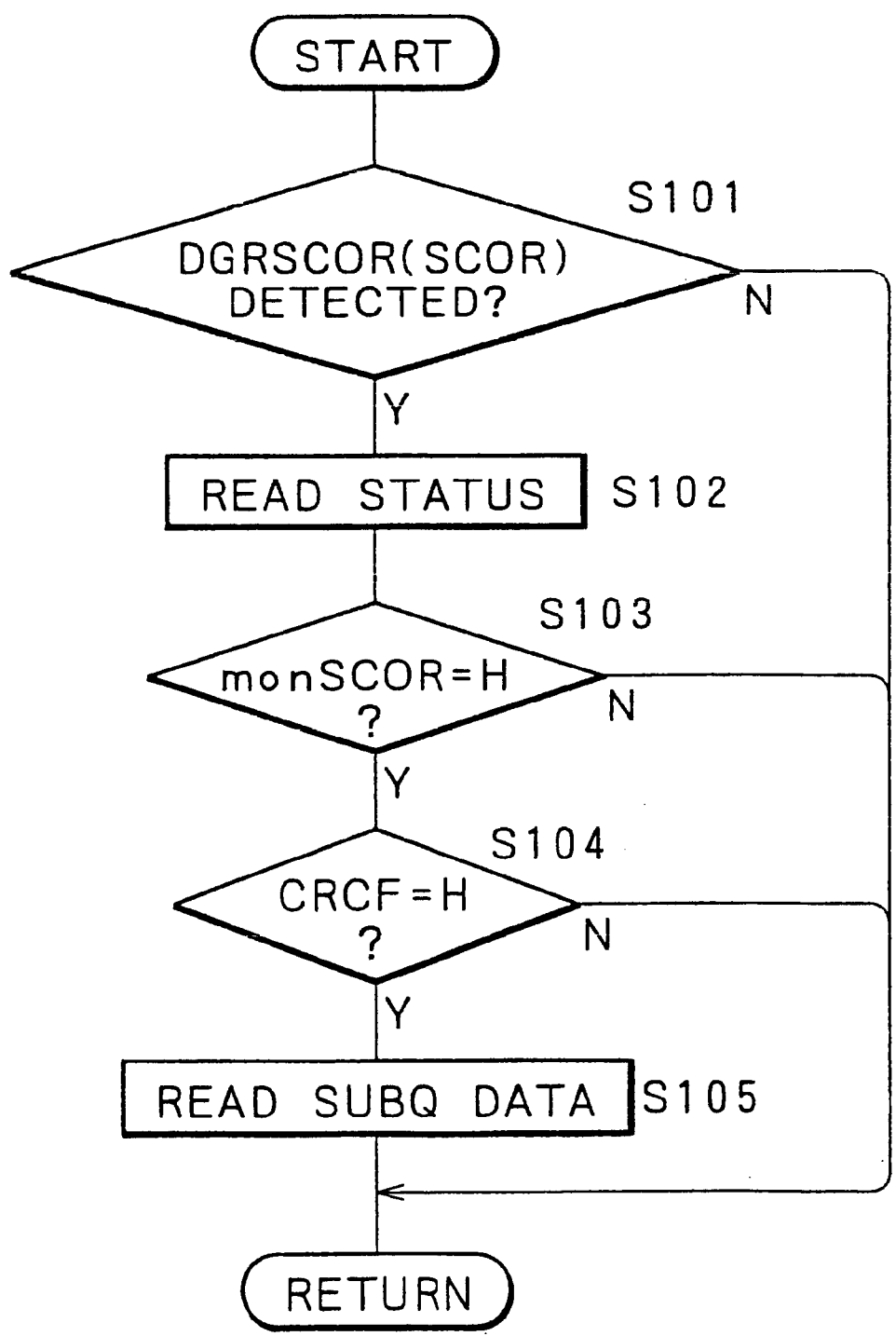
FIG. 4 is a flowchart showing a processing routine which is executed by a system controller in control of writing into a buffer memory.

To begin with, control of the buffer memory in a reproduction mode is premised on the fact that the system controller 14 is executing the processing routine shown in the flowchart of FIG. 4. With the execution of the processing routine shown in FIG. 4, the system controller 14 makes a decision as to whether or not to carry out reading of the Status and the subQ data.

First, at step S101, the system controller 14 makes a decision as to whether or not a signal DGRSCOR delivered from the SCOR output terminal 33 is detected. In another state where a signal SCOR is delivered from the SCOR output terminal 33 as will be mentioned later, a decision is made at step S101 as to whether or not the signal SCOR is detected.

If the result of this decision at step S101 is negative, the operation returns to the process of step S101 in this routine. Meanwhile, if the result of the decision is affirmative, the operation proceeds to step S102 to read out Status. This Status indicates a signal monSCOR and a signal monGRSCOR obtained correspondingly to the timing of detection of the signal DGRSCOR at step S101. The status of the signal CRCF in this case is also handled as Status.

After the Status has thus been read out at step S102, the operation proceeds to step S103, where a decision is made as to whether or not the signal monSCOR read out as Status has a high level. As mentioned already, the signal monSCOR is a pulse obtained at the timing of detection of the signal SCOR, and this pulse is turned to a high level in case the signal SCOR is detected at a proper timing, or is turned to a low level in another case.

If the result of the decision at step S103 is negative, the operation returns to step S101 in this routine. Meanwhile, if the result is affirmative, the operation proceeds to step 104, where a decision is made as to whether or not the signal CRCF read out as Status has a high level.

When the result of the decision at step S104 is negative to signify that the signal CRCF has a low level, it means that no reliability is existent in the subQ data read at this timing, so that the operation returns to step S101 in this routine. Meanwhile, if the result of the above decision is affirmative to signify that the signal CRCF has a high level, it means that there is no error in the subQ data, so that the operation proceeds to step S105.

Subsequently, the subQ data are read out at step S105. The subQ data to be read out here are those inserted in the subcoding frame reproduced from the disk at the timing of signal DGRSCOR (signal SCOR) detected at step S101, and the time base information (absolute time information) at this position can be grasped from such data.

Hereinafter an explanation will be given of the memory control operation performed by the system controller 14 on the premise that the above processing routine is executed.

Figure 5:
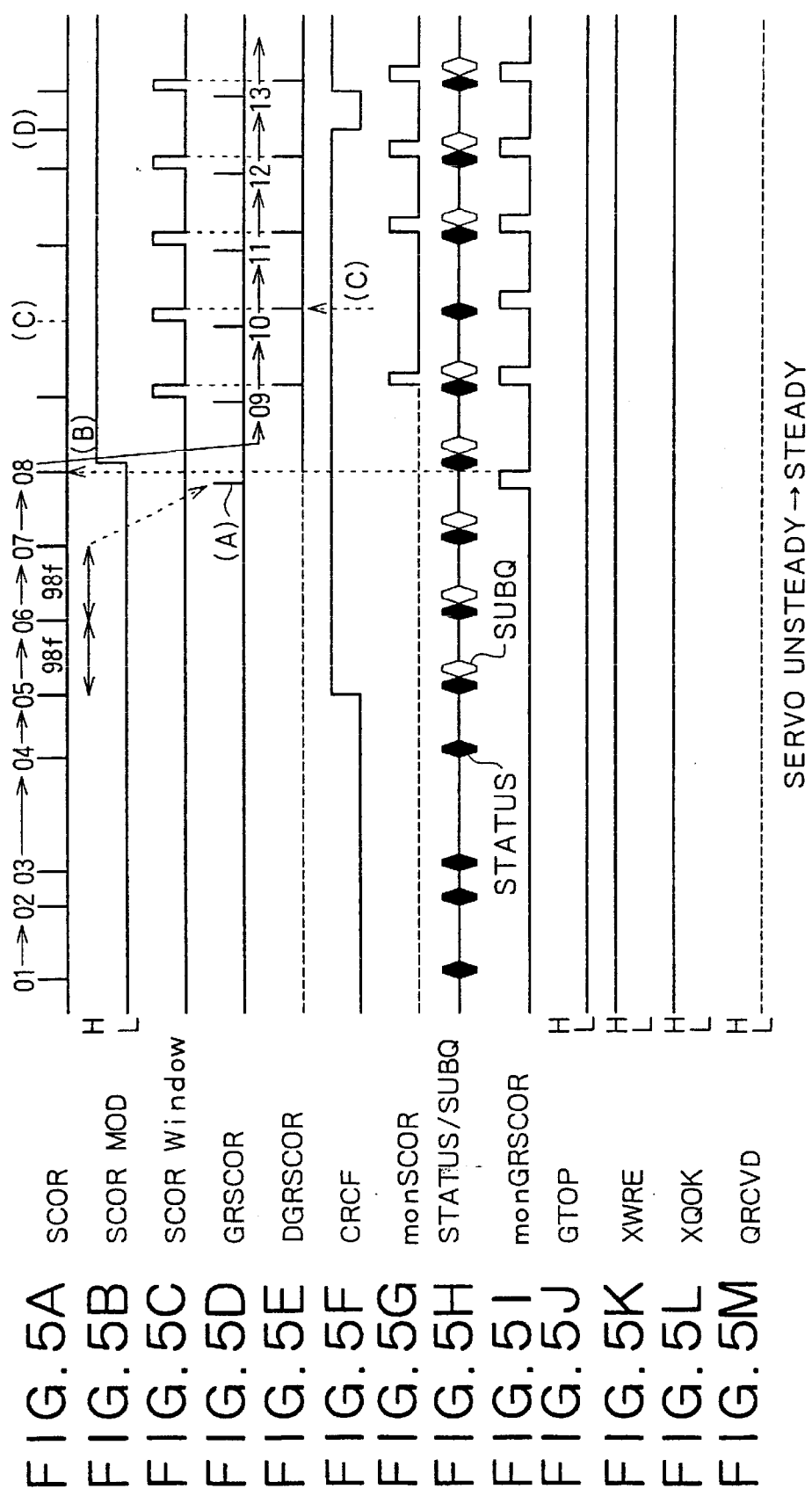
FIGS. 5A to 5M are timing charts showing a memory control operation in the present embodiment.

FIG. 5 is a timing chart showing a memory control operation performed in access. Successively to the timing chart of FIG. 5, another control operation at the start of data writing into the buffer memory and a further control operation during subsequent data writing will be explained with reference to timing charts of FIGS. 6 and 7, respectively.

In accessing a target position on the disk for sound link control for example, there occurs a transitional state where a tracking servo action or the like is shifted from an unstable condition to a stable condition. In FIG. 5, there is shown a control operation performed in accordance with such transition of the servo condition.

Numerals from 01 to 13 in this chart show regular timings for detection of the subcoding frame sync (S0, S1) to be detected from the reproduced data, correspondingly to the sequential timings of the generation of signal SCOR or GRSCOR. That is, these numerals sequentially denote a lapse of time in units of subcoding frames (98 EFM frames).

In this example, a signal SCOR is detected first at timing 01 in FIG. 5A after the access. In synchronism with the timing of detection of the signal SCOR delivered from the SCOR output terminal 33, the system controller 14 reads out Status as shown in FIG. 5H and, if possible, reads out the subQ data successively thereto.

The signal SCOR generated at timings 01 to 05 is detected at unsteady timings in accordance with unsteady servo conditions. That is, the signal SCOR is not considered to appear normally at a correct 98-frame interval. It is detected that, in the time period up to this point, the signal CRCF is at its low level to signify that the subQ data cannot be read normally.

Thereafter the servo condition is rendered steady, and posterior to a start position of timing 05, the signal SCOR is detected accurately at a 98-frame interval twice in succession at subsequent timings 06 to 07, whereby a signal GRSCOR is generated in the memory control signal generation circuit 31 as described with reference to FIG. 2. More specifically, a signal GRSCOR is generated first at timing (A) (after a lapse of 92 frames from the 07th signal SCOR in FIG. 5D). In synchronism therewith, a signal CRCF of a high level is obtained at timing 05.

The system controller 14 reads the Status at timing 08 of the signal SCOR. As the Status is thus read, there is detected a signal monGRSCOR (FIG. 5I) turned to a high level in response to the signal GRSCOR obtained at timing (A) in FIG. 5D. Such detection of the signal monGRSCOR signifies generation of a signal DGRSCOR after a lapse of 9 frames.

In this case, upon first detection of the signal monGRSCOR, the system controller 14 in the present embodiment switches SCOR MOD to a high level at timing (B) shown in FIG. 5B, i.e., at a time point corresponding to completion of reading the Status. Consequently, a signal DGRSCOR is delivered thereafter, instead of the signal SCOR, from the SCOR output terminal 33.

More specifically, the system controller 14 receives the signal DGRSCOR from the SCOR output terminal 33 after timing 09 as shown in FIG. 5D, and then handles the timing of this generation as a start point of reading the Status/subQ data.

A signal SCOR Window produced on the basis of the signal GRSCOR (FIG. 5D) is generated first at timing 09 as shown in FIG. 5C, and a signal monSCOR, which is produced when the signal SCOR is positioned within SCOR Window, is also generated first at timing 09 as shown in FIG. 5G.

In FIG. 5, there is shown a state where the signal SCOR to be generated at timing (C) in FIG. 5A drops out, and false SCOR is generated at timing (D) in FIG. 5A. An operation to be performed against such error of the signal SCOR will be explained later with reference to FIG. 7.

A signal GTOP shown in FIG. 5J is a control signal which is outputted from the system controller 14 and, when turned to a high level, serves to open the gate for detection of the frame sync, thereby validating the entire frame sync detected. The signal GTOP is normally maintained at a low level, but is turned to a high level in case reproduction error is caused to such a degree that detection of the frame sync is rendered impossible due to some disk defect or external disturbance. It is supposed that the signal GTOP is maintained at a low level also in FIGS. 6 and 7, which will be described afterward, as well as in FIG. 5.

Signals XWRE and XQOK shown in FIGS. 5K and 5l respectively are commands outputted for memory control from the system controller 14 to the memory controller 8.

The signal XWRE serves to permit data writing at the write address WA shown in FIG. 8. This is an active low signal which indicates inhibition by its high level or indicates permission by its low level. Therefore, in the stage of FIG. 5 where the signal XWRE has a high level, data writing into the buffer memory 9 is so controlled as not to be executed.

The signal XQOK indicates verification of the data written until then, and serves to advance the verified address VWA (see FIG. 8), thereby validating the reserved data to be effective.

A signal QRCVD shown in FIG. 5M indicates verification OK of the data. This signal is outputted from the memory controller 8 to the system controller 14 in response to the signal XQOK for example.

Figure 6:
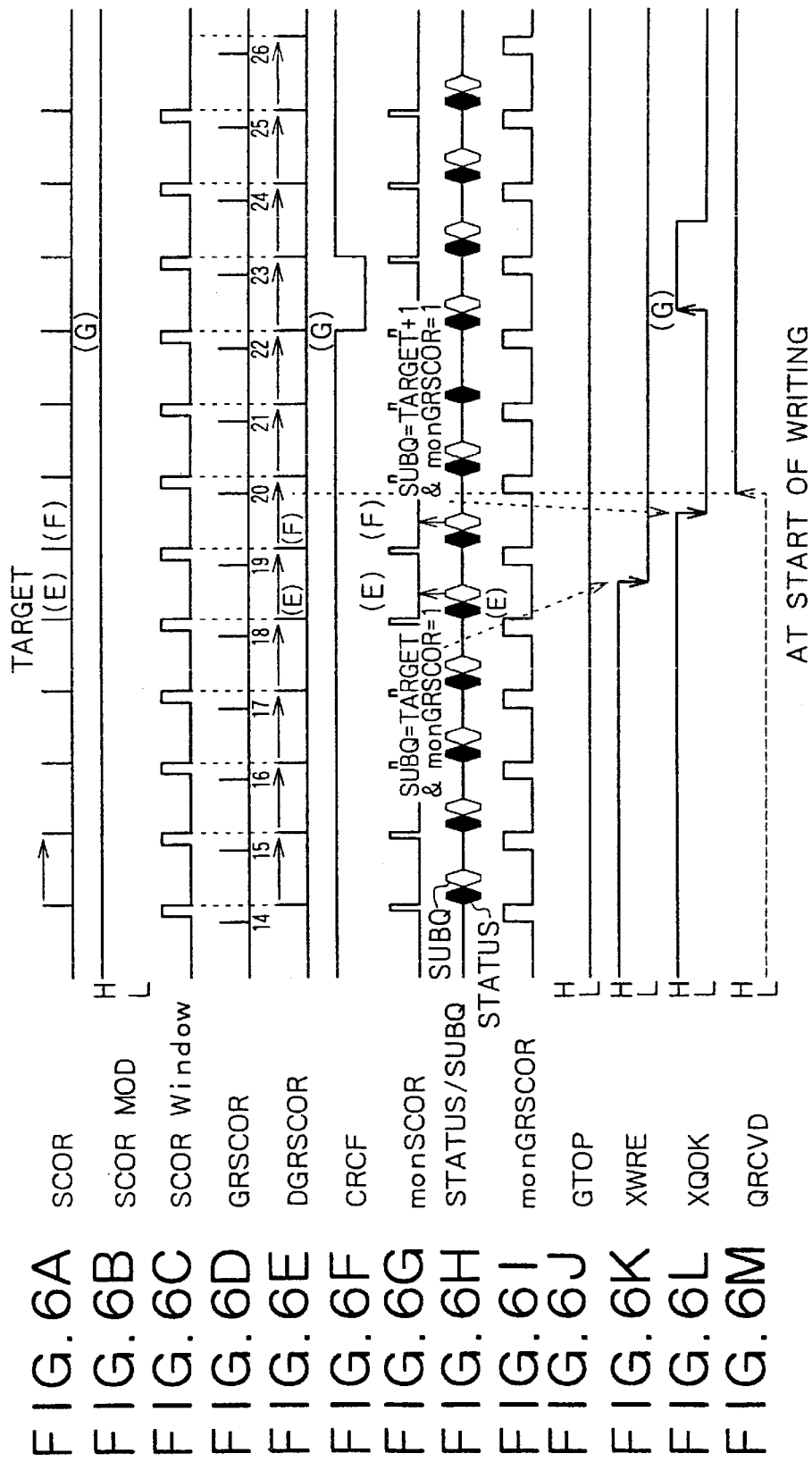
FIGS. 6A to 6M are timing charts showing another memory control operation in the present embodiment.

FIG. 6 shows operation timings succeeding the operation of FIG. 5, inclusive of the start of data writing into the buffer memory 9. Signals of FIGS. 6A to 6M are the same as those of FIG. 5A to 5M, respectively. The lapse of time in units of subcoding frames is denoted here by numerals 14 to 25 which follow 13 in FIG. 5.

In this stage, SCOR MOD shown in FIG. 6B has a high level, so that a signal DGRSCOR shown in FIG. 6E is delivered from the SCOR output terminal 33 to the system controller 14, which therefore reads out the Status and the subQ data at the timing of this signal DGRSCOR.

It is supposed here that the target subQ data (Target) for data link (sound link) is at a position corresponding to the 18th signal SCOR at timing (E) in FIG. 6A.

The system controller 14 reads out the Status as shown in FIG. 6H in response to a signal DGRSCOR (FIG. 6E) generated at timing (E). The Status at this point is such as monGRSCOR=H and monSCOR=H, and a signal CRCF also has a high level. In this case, the system controller 14 reads out the subQ data after deciding in succession that the subQ data is to be read out.

Then, it becomes possible to recognize, from the contents of the subQ data, that the position thereof corresponds to the target position for data link, so that the system controller 14 turns the signal XWRE from a high level to a low level at the timing shown in FIG. 6K, thereby permitting the data writing into the buffer memory 9. As a result, the memory controller 8 starts writing the data, which are relevant to the target position, into the buffer memory 9 in accordance with designation of the write address WA.

In the present embodiment, the following operation is performed at the 19th timing (F) which succeeds the start of the data writing.

At timing (F), the time base information of the subQ data is expected to be Target+1 (frame).

The system controller 14 judges the Status read out at timing (F) in FIG. 6H, and it is recognized here that the Status is such as monGRSCOR=monSCOR=H, and the signal CRCF also has a high level. Since the conditions are satisfied in this case, the system controller 14 subsequently reads out the subQ data in succession. It is decided here that the subQ data have time base information of Target+1. In this case, the system controller 14 changes the signal XQOK from a high level to a low level at the timing shown in FIG. 6L, whereby the data written into the buffer memory 9 at the preceding timing are validated to be effective. Upon delivery of this signal XQOK, the memory controller 8 outputs a signal QRCVD of a high level, which indicates verification OK, at the timing shown in FIG. 6M.

When the system controller 14 outputs a command indicating the state as XWRE=XQOK=L, the controller 14 always monitors the signals monGRSCOR and QRCVD. If either of the signals monGRSCOR and QRCVD is turned to a low level to signify that a steady reproduction state fails to be attained or the buffer memory 9 may overflow, then the signals XWRE and XQOK are switched to a high level to thereby halt the data writing into the buffer memory 9, and the operation proceeds to the next data link control for example.

While the system controller 14 outputs a command as XWRE=XQOK=L, if the signal monGRSCOR is turned to a high level and either of the signals monSCOR and CRCF is turned to a low level, it signifies a lack of the reliability of the subQ data. In this case, the signal XQOK is changed to a high level to thereby reserve determination of the data writing.

This control operation is performed in synchronism with timing (G) of the signal SCOR shown in FIG. 6A for example. At this point, although the signal SCOR can be obtained at a proper timing, an error is detected as a result of reading the subQ data due to some factor, so that the signal CRCF is turned to a low level during the subcoding frame period corresponding to timing (G). For this reason, the system controller 14 changes the signal XQOK to a high level at timing (G) in FIG. 6L, thereby reserving determination of the data writing. It is decided in this case that continuity is attained in the contents of the succeeding subQ data at the 23rd timing. Thus, the write data are verified by switching the signal XQOK to a low level as shown in FIG. 6L.

Figure 7:
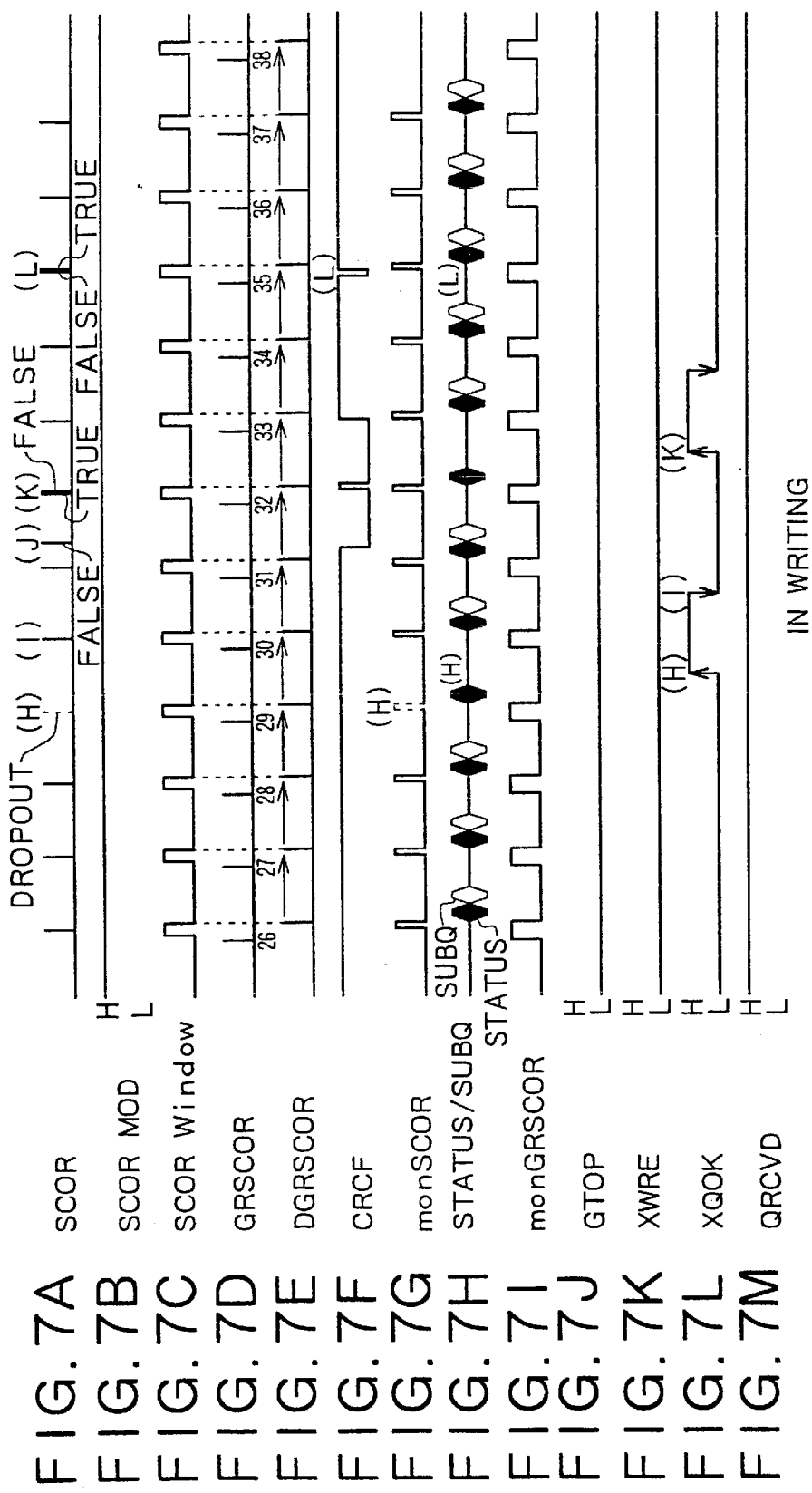
FIGS. 7A to 7M are timing charts showing a further memory control operation in the present embodiment.

FIG. 7 shows an operation performed continuously with FIG. 6. In this chart, there are shown operation timings during the data writing into the buffer memory 9. Signals of FIGS. 7A to 7M are the same as those of FIG. 5A to 5M and FIGS. 6A to 6M, respectively. The lapse of time in unit of subcoding frame is denoted here by numerals 26 to 38 which follow 25 in FIG. 5.

In this case, the signal SCOR is detected normally until the 28th timing for example, and the signal CRCF is at a high level, so that the system controller 14 executes reading of the Status/subQ data in units of subcoding frames. Since a normal result is obtained with regard to the Status as well, the signals XWRE and XQOK sent as commands to the memory controller 8 are maintained at a low level, whereby the data writing into the buffer memory 9 and verification of the write data are performed normally.

There is shown a temporary dropout of the signal SCOR at the next 29th timing denoted by (H) in FIG. 7A.

In this case, a signal monSCOR is not generated at timing (H) in FIG. 7G due to such a dropout of the signal SCOR. Therefore, in the Status read out at timing (H) in FIG. 7H, the signal monSCOR is detected to be at a low level, so that reading of the subQ data is not executed. The signal XQOK is changed from a low level to a high level at the relevant timing, as shown in FIG. 7L. Meanwhile the signal XWRE shown in FIG. 7K is maintained at a low level, hence reserving verification of the data reproduced at timing (H) and written into the buffer memory 9.

Subsequently, the signal SCOR is obtained normally again at timing (I) of the next subcoding frame that succeeds timing (H), i.e., at the timing of the 30th subcoding frame. At this point, the signals monGRSCOR and monSCOR representing the Status are both at a high level, and the signal CRCF is also at a high level, so that the system controller 14 executes reading of the subQ data. Since it is decided here that the subQ data have temporal continuity with the preceding data, the signal XQOK is turned to a low level again at timing (I) in FIG. 7L, and the data written until the immediately preceding moment are verified.

Thus, in the present embodiment, it becomes possible to perform proper reservation of the write data and subsequent verification thereof regardless of any dropout of the signal SCOR caused during the data writing for example.

Further in this chart, false SCOR is generated, as shown in FIG. 5A, at timing (J) slightly after the 31st timing.

In the present embodiment, a decision as to whether or not to read out the subQ data is made entirely on the basis of the signal monSCOR, and in the process of generating the signal monSCOR, appearance of any monSCOR responsive to such false SCOR is prevented. That is, the signal monSCOR is outputted, as shown in FIG. 7G, at a fixed interval corresponding to the generation timing of the original signal SCOR. For this reason, as shown in FIG. 7H also, the system controller 14 does not read the Status or the subQ data at timing (J).

At the next 32nd timing (K), there are detected signals SCOR very proximate to each other in order of true SCOR→false SCOR, which are generated in the SCOR Window shown in FIG. 7C for example.

In this case, the Status is represented by a signal monSCOR of a high level, but the signal CRCF is at a low level due to some error caused in reading the subQ data correspondingly to the false SCOR, so that the system controller 14 does not read the subQ data this time, and turns the signal XQOK to a high level at timing (K) in FIG. 7L, thereby reserving verification of the write data. In this case, the system controller 14 confirms again that, after the succeeding 33rd timing, the temporal continuity of the read subQ data is OK, and then changes the signal XQOK to a low level.

Further at the 35th timing (L) in FIG. 7A, signals SCOR are generated in order of false SCOR→true SCOR in the SCOR Window shown in FIG. 7C.

In this case, an error of the subQ data is detected relative to, e.g., the false SCOR generated previously, so that the signal CRCF is turned temporarily to a low level. However, no error is generated in the subQ data relative to the true SCOR generated immediately thereafter, whereby the signal CRCF is returned to a high level. The signal monSCOR representing the Status is also at a high level, so that the system controller 14 reads out the subQ data at a proper timing as shown in FIG. 7H. The subQ data read out here have the contents inserted in the subcoding frame correspondingly to the true SCOR. If the result of reading out the subQ data signifies that the time base continuity is OK, the signal XQOK is maintained at a low level, and normal verification is executed.

Thus, it is understood in the present embodiment that, despite appearance of such false SCOR, normal memory writing control is executed properly.

Figure 15A:
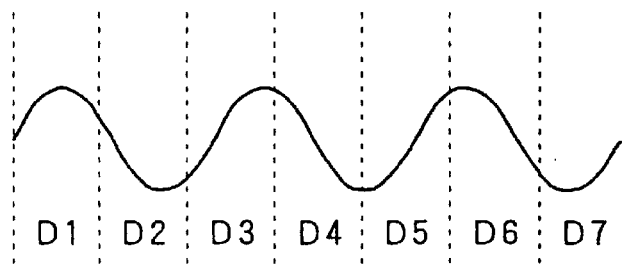
FIGS. 15A to 15C are explanatory diagrams typically showing a normal writing state and writing error states caused as results of data link control to the buffer memory.
Figure 15B:
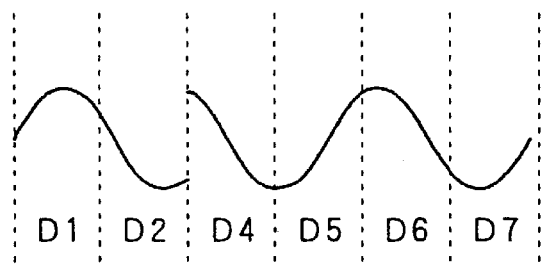
Figure 15C:
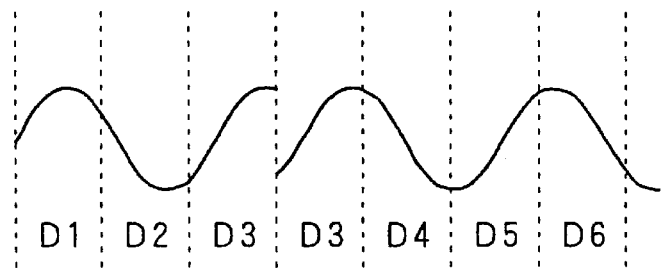

More specifically, normal data writing into the memory can be ensured in the present embodiment without being affected harmfully by the dropout of SCOR or the generation of false SCOR, hence suppressing occurrence of error in the data writing link shown in FIGS. 15B and 15C, for example.

The embodiment of the present invention mentioned above represents an exemplary case of reproducing audio data recorded on a CD. However, it is also possible to apply the present invention to an apparatus capable of reproducing audio data from some other disk media than a CD and equipped with a memory for temporary storage of the reproduced data.

It is further possible to apply the present invention to an apparatus capable of reproducing some data other than audio data and equipped with a memory for temporary storage of the reproduced data. Particularly in such data reproduction, high fidelity is requisite with respect to the reproduced data and any data link error may be fatal, so that the structure of the present invention is remarkably useful.

In the present invention, as described above, a stable sync detection signal DGRSCOR, which is outputted stably per subcoding frame, for example, in synchronism with the timing for proper detection of a synchronizing signal, is generated on the basis of a sync detection signal SCOR outputted at the timing of detection of the synchronizing signal (sync pattern S0, S1) inserted in the data reproduced from a disk recording medium. A timing to read out the time base information of the reproduced data (absolute time information of subQ data) required for control of data writing into the memory means is obtained on the basis of such stable sync detection signal.

The stable sync detection signal is generated substantially at the same timing as that of the sync detection signal, and is produced at a very steady timing stabilized more than the sync detection signal which is affected substantially directly by the actual state of reproduction. Therefore, in comparison with a known case where the timing to read out the time base information of the reproduced data is obtained on the basis of the sync detection signal, the time base information can be read out at a more accurate timing. In other words, it becomes possible to prevent the erroneous reading of incorrect time base information derived from dropout of a sync detection signal SCOR or generation of a false sync detection signal, hence enabling the exact execution of data link control with regard to the memory means to consequently maintain normal continuity of the reproduced data. In the present invention, therefore, the reproduced data fidelity can be enhanced with improvements in the reliability of the reproduction capability.

In generating the stable sync detection signal DGRSCOR mentioned, first a protective sync detection signal GRSCOR is generated on the basis of the sync detection signal SCOR generated stably. This protective sync detection signal is outputted for the first time upon stabilization of the sync detection signal SCOR, and thereafter is outputted steadily per predetermined data unit period (subcoding frame period). The stable sync detection signal DGRSCOR is generated correspondingly to the timing of normal appearance of the sync detection signal with reference to the timing of the protective sync detection signal.

According to such a structure contrived for signal generation, it is possible to ensure satisfactory stability in outputting the stable sync detection signal DGRSCOR. Since this signal is produced on the basis of the protective sync detection signal GRSCOR which has been known heretofore in the prior art, the circuit configuration of the signal generation circuit can be simplified as well.

Further in the present invention, there is produced a first monitor signal monGRSCOR which is outputted for a predetermined duration at the timing of generation of the protective sync detection signal GRSCOR. This first monitor signal is capable of indicating whether or not the protective sync detection signal GRSCOR is generated, and also indicates that the sync detection signal SCOR is generated in a steady state. By the use of this signal in compliance with the necessity of the memory controller, higher reliability is rendered attainable in the operation of controlling the data writing into the memory means.

For example, in the present invention, the first monitor signal monGRSCOR is utilized for making a decision as to whether the sync detection signal SCOR or the stable sync detection signal DGRSCOR is to be selected as a reference timing signal for reading out the time base information. As a result, it becomes possible to read out the time base information based on the stable sync detection signal DGRSCOR at the timing when the sync detection signal SCOR is generated stably and the stable sync detection signal DGRSCOR is also generated with accuracy. That is, desired stability can be achieved in the memory control operation.

Further in the present invention, a second monitor signal monSCOR is generated to be outputted during a predetermined period when the sync detection signal SCOR is obtained in the duration of a window signal (SCOR Window). This second monitor signal is capable of indicating that the signal SCOR has been obtained at a normal timing, as is obvious from the process of generation thereof. Accordingly, using this signal may serve as well to enhance the control reliability in the data writing into the memory means.

In the present invention, whether or not the time base information is to be read out is decided on the basis of this second monitor signal for example, thereby determining permission or prohibition of reading the proper time base information that conforms with the generation state of the actual sync signal, hence achieving actual stability in the data writing control.

Although the present invention has been described hereinabove with reference to the preferred embodiment thereof, it is to be understood that the present invention is not limited to such an embodiment alone, and a variety of other changes and modifications will be apparent to those skilled in the art without departing from the spirit of the invention.

The scope of the present invention, therefore, is to be determined solely by the appended claims.

What is claimed is:

1. A memory control device capable of controlling data writing into a memory means where the data reproduced from a disk recording medium are stored temporarily, said device comprising:

a signal generation means for generating a stable sync detection signal which is obtained at a normal detection timing of a synchronizing signal in response to a sync detection signal generated by detection of the synchronizing signal inserted in the reproduced data per predetermined data unit; and a data writing control means capable of reading out time base information inserted per said predetermined data unit in synchronism with the timing of generation of said stable sync detection signal, and also capable of controlling the data writing into said memory means on the basis of the time base information thus read.

2. The memory control device according to claim 1, wherein said signal generation means comprises a protective sync detection signal generation means for generating, on the basis of said sync detection signal obtained at a stable timing, a protective sync detection signal to be outputted at a predetermined timing per period of said predetermined data unit; and a stable sync detection signal generation means for generating and outputting, in synchronism with the output timing of said protective sync detection signal, said stable sync detection signal correspondingly to the timing of normal appearance of said sync detection signal.

3. The memory control device according to claim 1, wherein said signal generation means comprises a protective sync detection signal generation means for generating, on the basis of said sync detection signal obtained at a stable timing, a protective sync detection signal to be outputted at a predetermined timing per period of said predetermined data unit; and a first monitor signal generation means for generating a first monitor signal to be outputted for a predetermined duration from a start point corresponding to the output timing of said protective sync detection signal.

4. The memory control device according to claim 3, wherein said data writing control means selects by switching either said sync detection signal or said stable sync detection signal as the reference timing to read out said time base information, in accordance with the presence or absence of said first monitor signal.

5. The memory control device according to claim 1, wherein said signal generation means comprises a window signal generation means for generating a window signal which corresponds to the normal appearance timing of said sync detection signal; and a second monitor signal generation means for generating a second monitor signal to be outputted for a predetermined duration in response to said sync detection signal obtained in the output duration of said window signal.

6. The memory control device according to claim 5, wherein said data writing control means makes a decision as to whether or not to read out said time base information, in accordance with the presence or absence of said second monitor signal.

* * * * *